(12) United States Patent
Young

(10) Patent No.: US 8,905,216 B2
(45) Date of Patent: Dec. 9, 2014

(54) QUICK CHANGE FRICTION LININGS FOR CONSTRICTING CLUTCH BRAKE ELEMENT

(71) Applicant: Eaton Corporation, Cleveland, OH (US)

(72) Inventor: Dennis R. Young, Sheffield Village, OH (US)

(73) Assignee: Eaton Corporation, Cleveland, OH (US)

( * ) Notice: Subject to any disclaimer, the term of this patent is extended or adjusted under 35 U.S.C. 154(b) by 89 days.

(21) Appl. No.: 13/793,476

(22) Filed: Mar. 11, 2013

(65) Prior Publication Data
US 2014/0251749 A1  Sep. 11, 2014

(51) Int. Cl.
*F16D 25/04* (2006.01)
*F16D 49/14* (2006.01)
*F16D 13/60* (2006.01)
*F16D 49/18* (2006.01)
*F16D 69/04* (2006.01)

(52) U.S. Cl.
CPC .............. *F16D 13/60* (2013.01); *F16D 25/046* (2013.01); *F16D 49/14* (2013.01); *F16D 49/18* (2013.01); *F16D 69/04* (2013.01); *Y10S 192/01* (2013.01)
USPC .............. 192/85.13; 192/107 T; 192/DIG. 1; 188/366

(58) Field of Classification Search
CPC ..... F16D 25/04; F16D 25/042; F16D 25/046; F16D 49/14; F16D 69/0416
USPC .............. 192/79, 85.03, 85.04, 85.12, 85.13, 192/107 T, DIG. 1; 188/366, 367
See application file for complete search history.

(56) References Cited

U.S. PATENT DOCUMENTS

| | | | |
|---|---|---|---|
| 2,311,113 A | | 2/1943 | Klocke |
| 2,637,345 A | * | 5/1953 | Kraft ................................. 92/90 |
| 2,637,427 A | | 5/1953 | Kraft |
| 2,662,625 A | | 12/1953 | Fawick |
| 3,022,877 A | * | 2/1962 | Fawick ...................... 192/85.13 |
| 3,092,231 A | | 6/1963 | Kneuss |
| 3,173,527 A | * | 3/1965 | Eakin ......................... 192/85.13 |

OTHER PUBLICATIONS

European Patent Office PCT/US2014/019851 Notification of Transmittal of International Search Report and Written Opinion of the International Searching Authority, dated Jun. 13, 2014.

\* cited by examiner

*Primary Examiner* — Richard M. Lorence
(74) *Attorney, Agent, or Firm* — Walker & Jocke

(57) ABSTRACT

A constricting clutch brake element (10) is operative to selectively transmit mechanical power between relatively movable rotating members. A plurality of backing plates (38) releasibly engage a plurality of friction linings (34). The friction linings are selectively moved radially to operatively engage annular body (12) and a central rotating member (26). The friction linings are releasibly engaged with corresponding backing plates (38) through interengaging ear portions (52) of the lining and slots (62) of the backing plates.

26 Claims, 10 Drawing Sheets

QUICK CHANGE FRICTION LININGS FOR CONSTRICTING CLUTCH BRAKE ELEMENT

TECHNICAL FIELD

This disclosure relates to mechanical power transmission products that selectively transmit power between relatively rotating members. This disclosure particularly relates to a constricting type clutch brake element and friction linings for use therewith that may be more readily replaced.

BACKGROUND

Clutch brake elements are used to transmit power in a controlled manner between relatively moving members. In some arrangements a rotating driver member may transmit power to a driven member via a clutch brake element that can operate to engage and disengage the driving and driven members. The driving and driven members may be engaged by moving friction material such as material on a friction lining operatively connected to the driving member, into a position where the driving member and the driven member are engaged via the friction material. Such engagement causes transmission of the rotational motion to the driven member which will begin rotating in coordination with the driving member. Thereafter when the driven member is to no longer be driven by the driving member, the friction material is moved to operatively disengage the members and the driven member is no longer moved in response to the driving member.

Clutch brakes can also be used to stop unwanted rotation of a moving member. In such applications a body of a clutch brake is fixed to a frame or other generally immovable structure. Rotation of a moving member is stopped or slowed by engagement of friction material operatively connected with the body, and the moving member. Because the body which is engaged through the friction material is fixed, the moving member is slowed or stopped as desired. Once the rotating member is stopped, the ability to member rotate again is achieved by disengaging the friction material and the rotating member.

In many applications, clutch brake elements are used both for the function of transmitting movement from a driving to a driven member, as well as to stop or slow the rotation of a driving or driven member when desired. One or more clutch brake elements may be used for each purpose based on their configuration.

Constricting clutch brake elements are a type of clutch brake that can be used in high power, high torque applications. In a constricting clutch brake element, a relatively rotatable member is operatively engaged and disengaged by moving friction linings radially inward relative to a body of the clutch brake element to achieve engagement, and radially outward to achieve disengagement. Airflex® type VC clutch brake elements manufactured by Eaton Corporation are an example of constricting clutch brake elements that are utilized in many types of heavy equipment and high torque applications.

In operation of constricting type clutch brake elements, the power is transmitted through a plurality of friction linings. These friction linings wear over time with repeated engagement and disengagement of the clutch brake element. Eventually the friction linings wear to the extent that they need to be replaced. Replacement of the friction linings requires taking the clutch brake element and its associated equipment out of service. Further, changing the friction linings of the clutch brake element requires at least partial disassembly of the element and considerable downtime for the machinery with which the clutch brake element is used.

Constricting clutch brake elements and associated friction linings may benefit from improvements.

SUMMARY OF DISCLOSURE

This application discloses an improved configuration for constricting clutch brake elements and the friction linings that may be used as a part of such elements. The improved element includes a plurality of friction linings that can be more readily changed. In the example arrangement, the friction linings include projecting portions that releasibly engage corresponding slots in backing plates. The backing plates are movably mounted and selectively movable radially on an annular body of the constricting clutch brake element.

Friction linings which have become worn can be removed from their operative position by relatively moving the projecting portions of the linings in the slots of the backing plates along a direction generally perpendicular to the radial direction. Such movement in the perpendicular direction enables disengaging the friction lining from the backing plate so that a new friction lining can be installed. Such a new friction lining is moved into the operative position by engaging the projecting portions of the new lining and corresponding slots of the backing plate, and moving the lining relative to the backing plate along the direction perpendicular to the radial direction. In an example arrangement, tabs associated with the friction lining prevent further perpendicular movement of the lining relative to the backing plate once the friction lining has reached its operative position. Further in example arrangements spring portions associated with the friction lining serve to hold the friction lining in the operative position during operation.

In the example arrangement the annular body of the constricting clutch brake element is configured so that the friction linings may be changed without a need for total or partial disassembly of the element. This enables worn friction linings to be more quickly replaced with new linings and reduces the amount of time that the clutch brake element and the machinery with which it is used are out of service.

DETAILED DESCRIPTION

Figure 1:
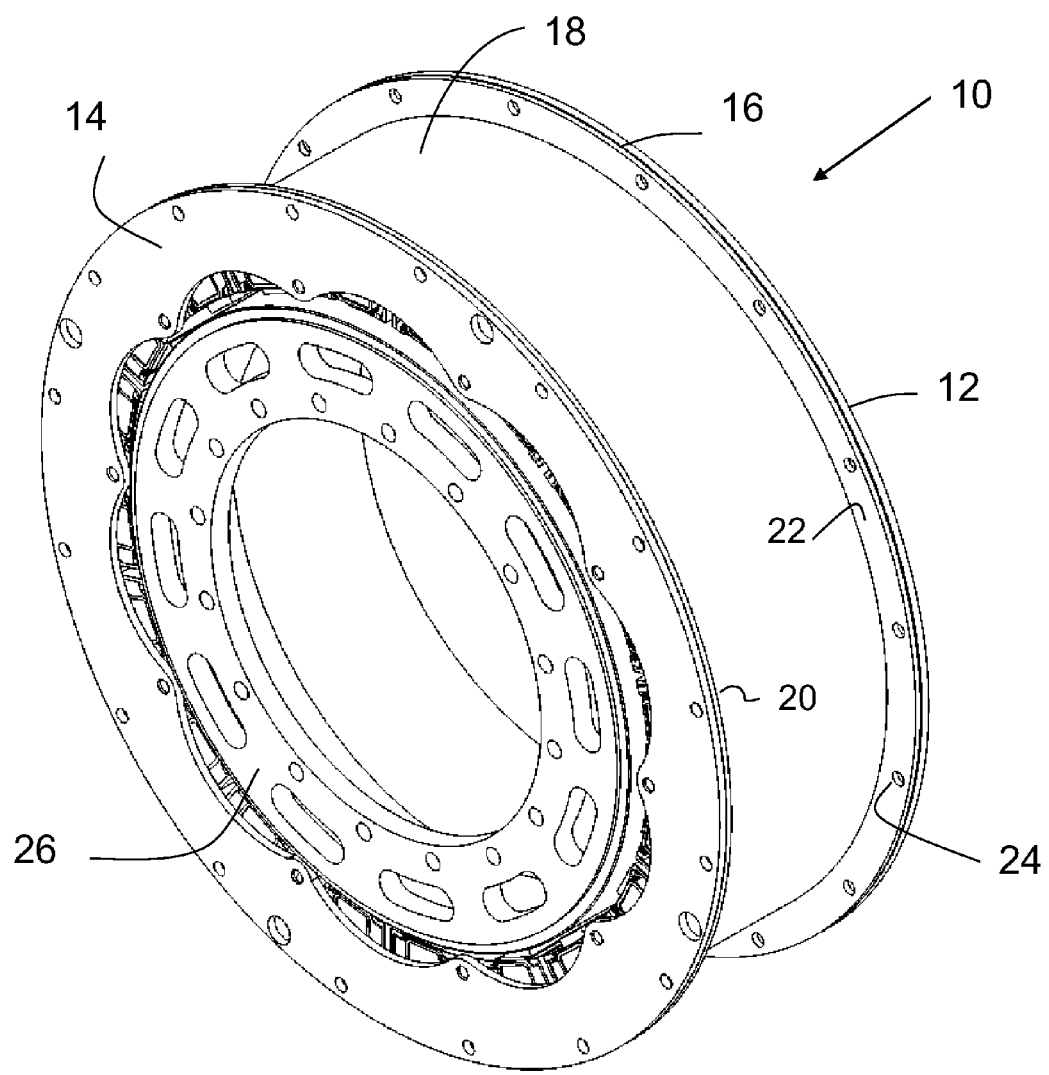
FIG. 1 is an isometric view of an example clutch brake element.

Referring now to the drawings and particularly to FIG. 1, there is shown therein an example of a constricting clutch brake element generally indicated 10. Element 10 has a generally annular body 12. The annular body 12 includes a pair of annular side plates 14 and 16. A rim 18 extends transversely between the side plates. Rim 18 includes flange portions 20 and 22 which are attached to an adjacent side plate by fasteners 24.

The example constricting clutch brake element 10 includes a central rotating member 26. In the example arrangement the central rotating member 26 is rotatably movable relative to the annular body 12 when the clutch brake element is disengaged. When the clutch brake element is engaged, the central rotating member 26 becomes operatively connected with the annular body 12 in a manner later discussed so that neither is rotatably movable relative to the other. As a result, in circumstances where the central rotating member 26 is in operative connection with a driving member and an annular body 12 is in operative connection with a driven member, rotating motion of the driving member can be selectively applied to the driven member by engaging and disengaging the clutch brake mechanism. Similarly where the annular body 12 is in operative connection with the driving member and the central rotating member 26 is in operative connection with the driven member, power from the driving member can be selectively applied to the driven member by engaging and disengaging the clutch brake mechanism.

Likewise in brake applications where it is desired to stop or slow a rotating member, the central rotating member 26 may be operatively connected to the rotating member that it is desired to stop or slow, and the annular body may be connected to a frame or other generally immovable structure that can absorb the force associated with stopping or slowing the rotating member. In such arrangements engaging the clutch brake mechanism stops or slows the rotation of the central rotating member 26 and thus acts as a brake with respect to movement thereof. Similarly the annular body 12 may in operative connection with the rotating member that is desired to be selectively slowed or stopped, and the central rotating member 26 may be in operative connection with a frame or other generally immovable structure. Again in this arrangement, engaging the clutch brake element will cause the rotating member to slow or stop. Of course as can be appreciated, in some arrangements it may be desired to completely stop rotation of the rotating member as rapidly as possible, while in other arrangements it may be desired only to slow the rotating member's speed while rotational motion continues. Selectively engaging and disengaging the clutch brake mechanism of the example embodiment may serve to perform both functions.

Figure 5:
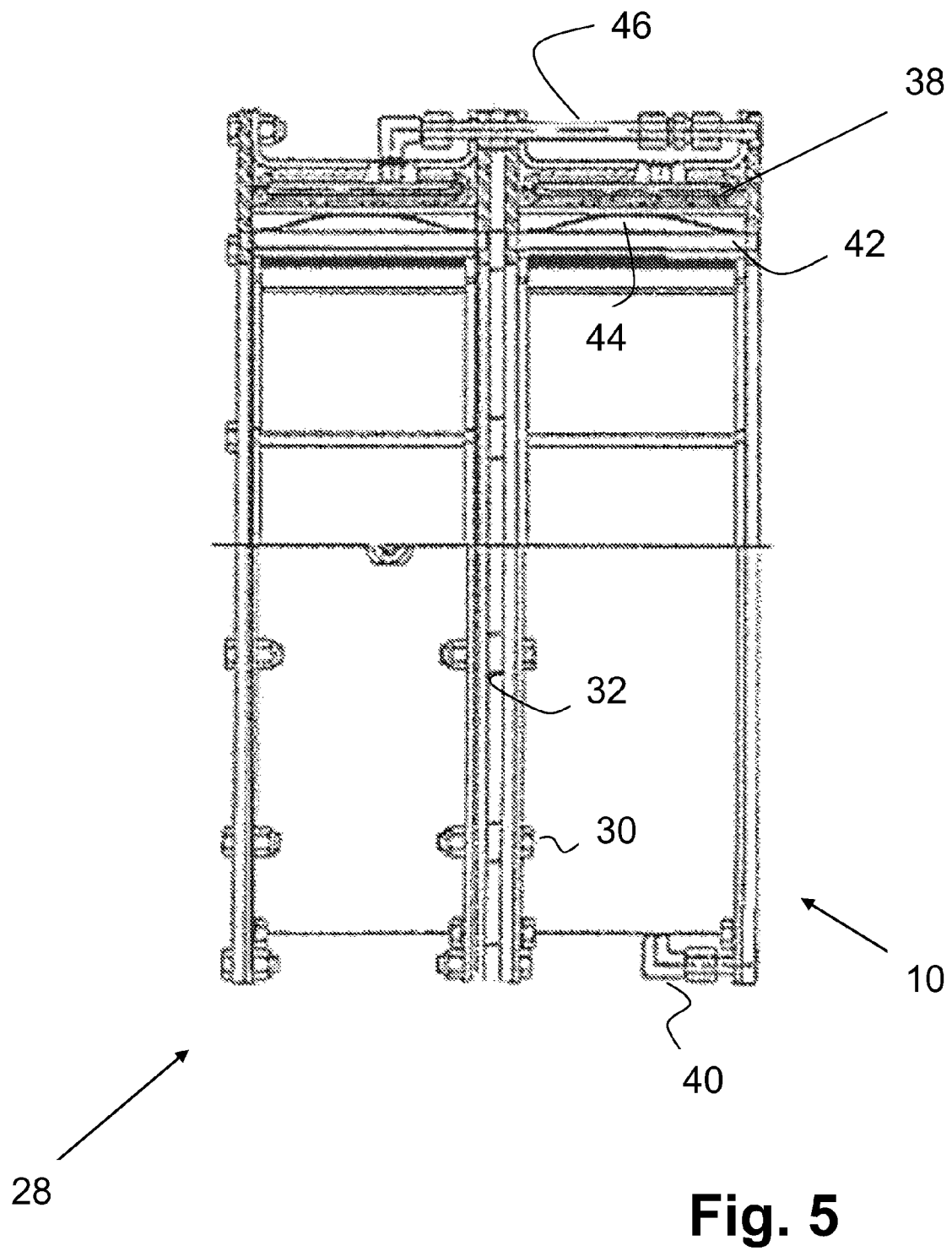
FIG. 5 is a partially sectioned view of a pair of constricting clutch brake elements mounted in tandem.
Figure 6:
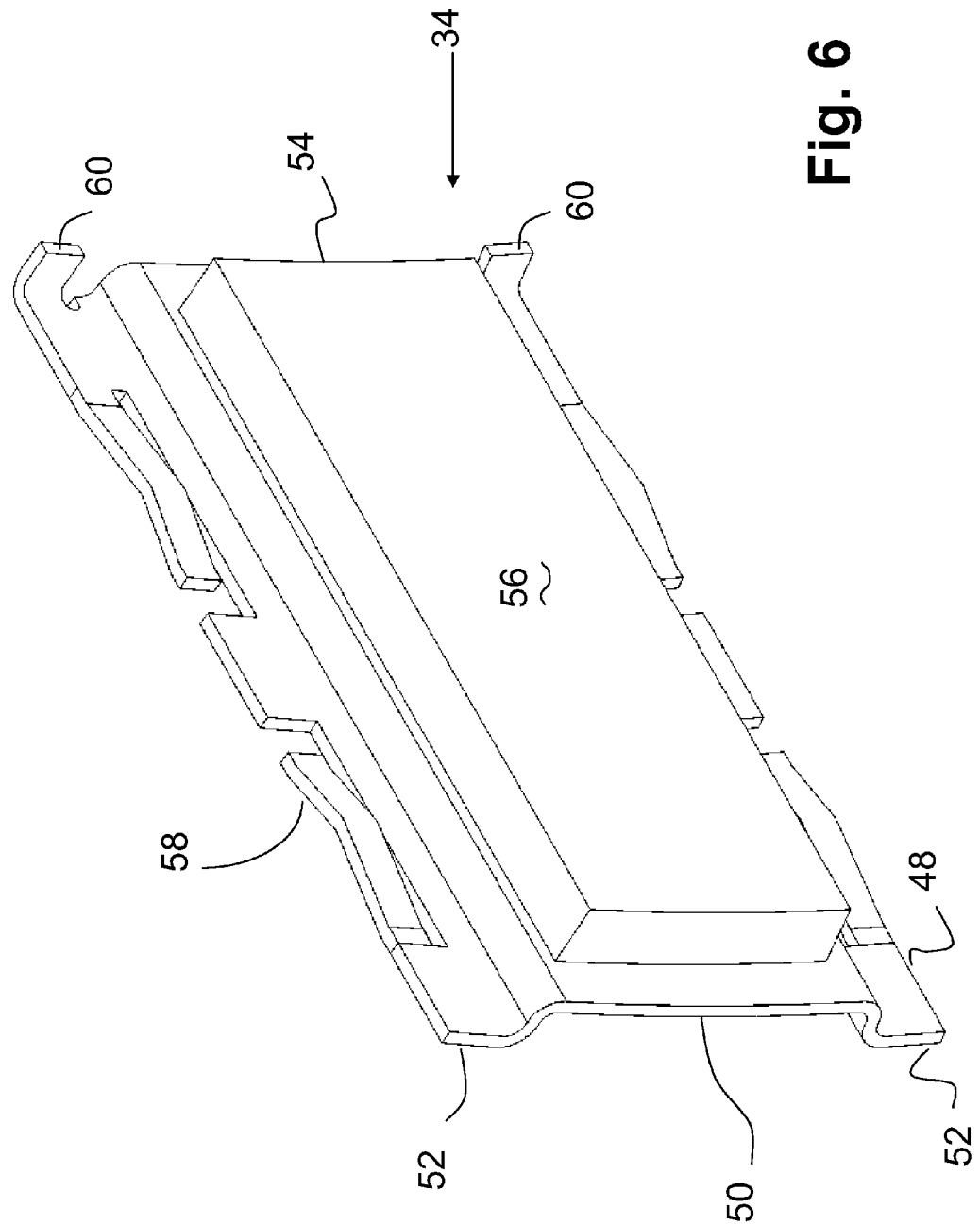
FIG. 6 is an isometric view of an example friction lining.

Numerous different arrangements and configurations may be utilized when operating constricting clutch brake elements of example embodiments to control shafts or other rotating devices and to provide selective power transmission between driving and driven members. For example as shown in FIG. 5, multiple constricting clutch brake elements may be joined together to provide greater power handling capability. For example the arrangement shown in FIG. 5 includes element 10 joined in stacked relation with another similar constricting clutch brake element 28. In this example arrangement the elements are arranged in axially aligned stacked relation through fasteners 30 and spacers 32 that extend between the side walls of the respective elements. Of course this arrangement is exemplary and in other arrangements other configurations may be used.

Figure 2:
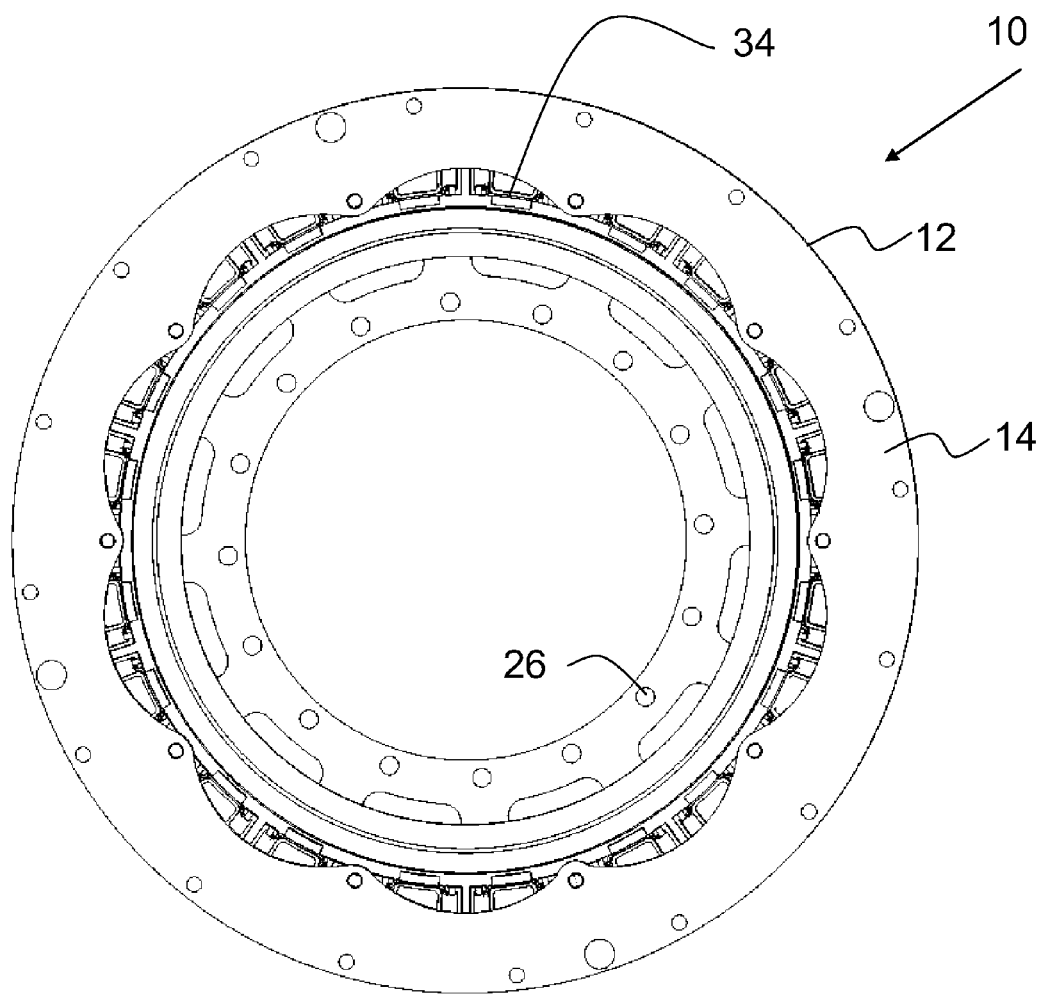
FIG. 2 is a side plan view of the clutch brake element shown in FIG. 1.

The operation of the example constricting clutch brake element is further explained with reference to FIGS. 2 through 4. Operative engagement of the annular body 12 and the rotating member 26 is achieved by movement of a plurality of friction linings 34 relative to the annular body 12 of the clutch brake element. In the exemplary arrangement the friction linings are movable radially relative to the annular body. The friction linings are enabled to be moved radially inward so as to operatively engage the annular body 12 with the central rotating member 26. In addition the friction linings are enabled to be selectively moved radially outward so as to operatively disengage the annular body and the central rotating member.

Figure 3:
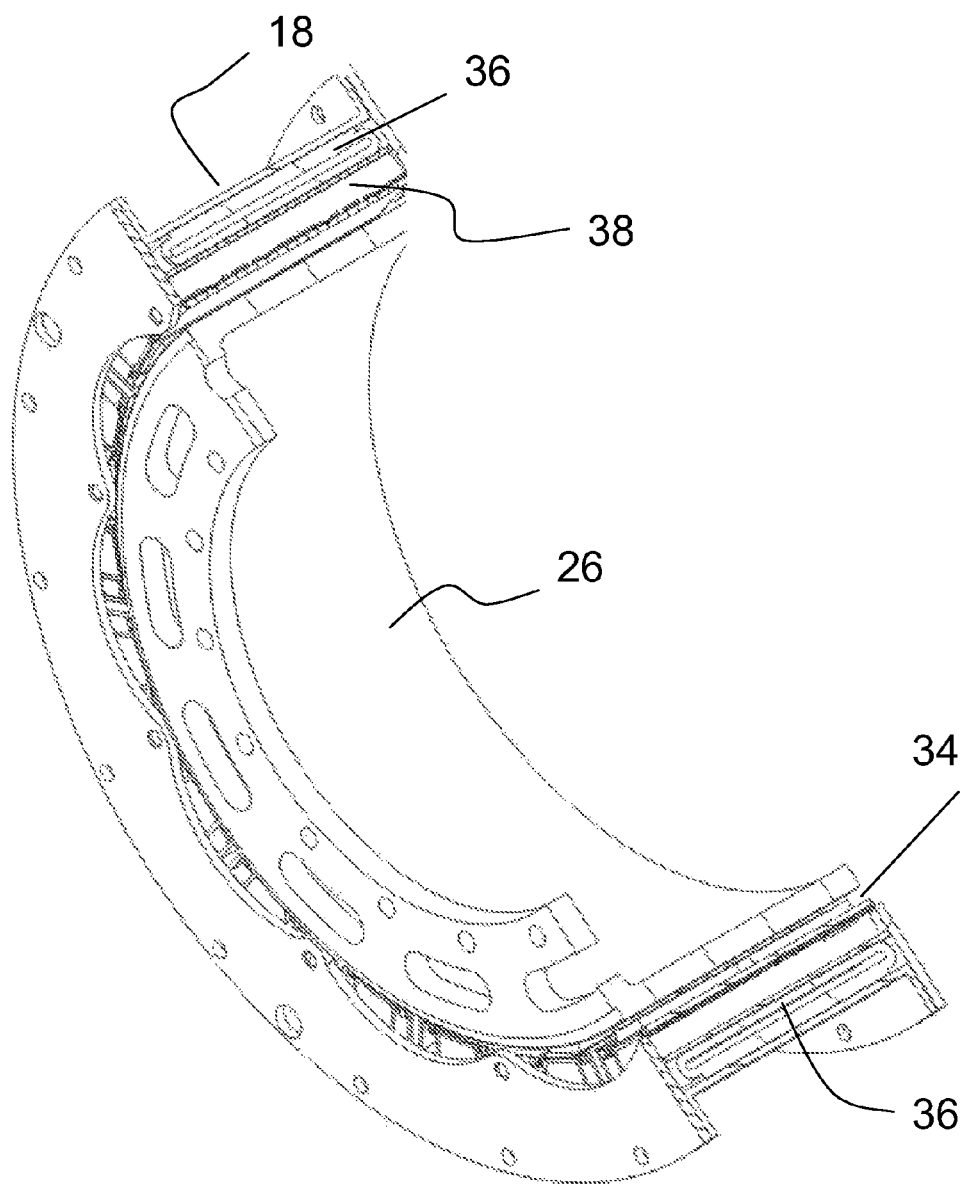
FIG. 3 is a diametric sectional view of the clutch brake element.
Figure 4:
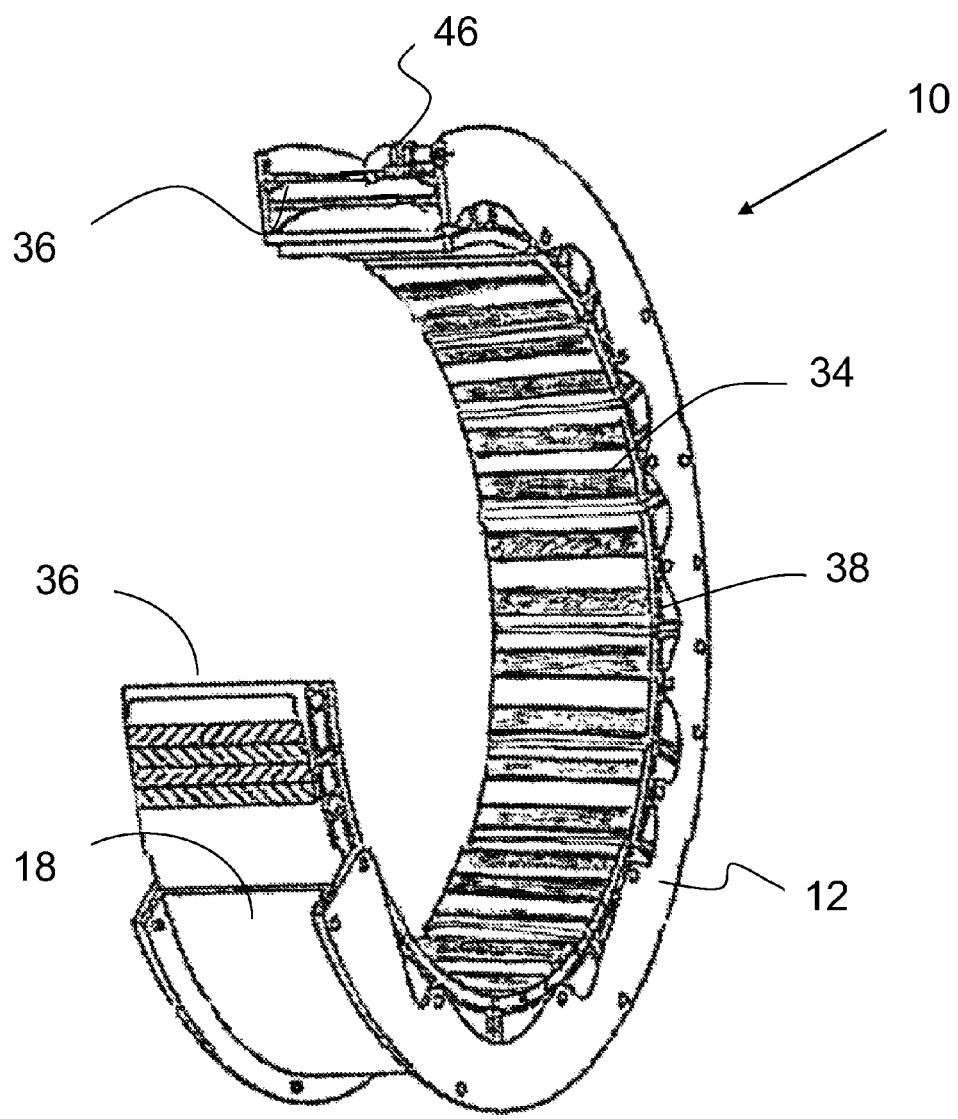
FIG. 4 is an isometric sectional view of a clutch brake element with the central member removed.
Figure 10:
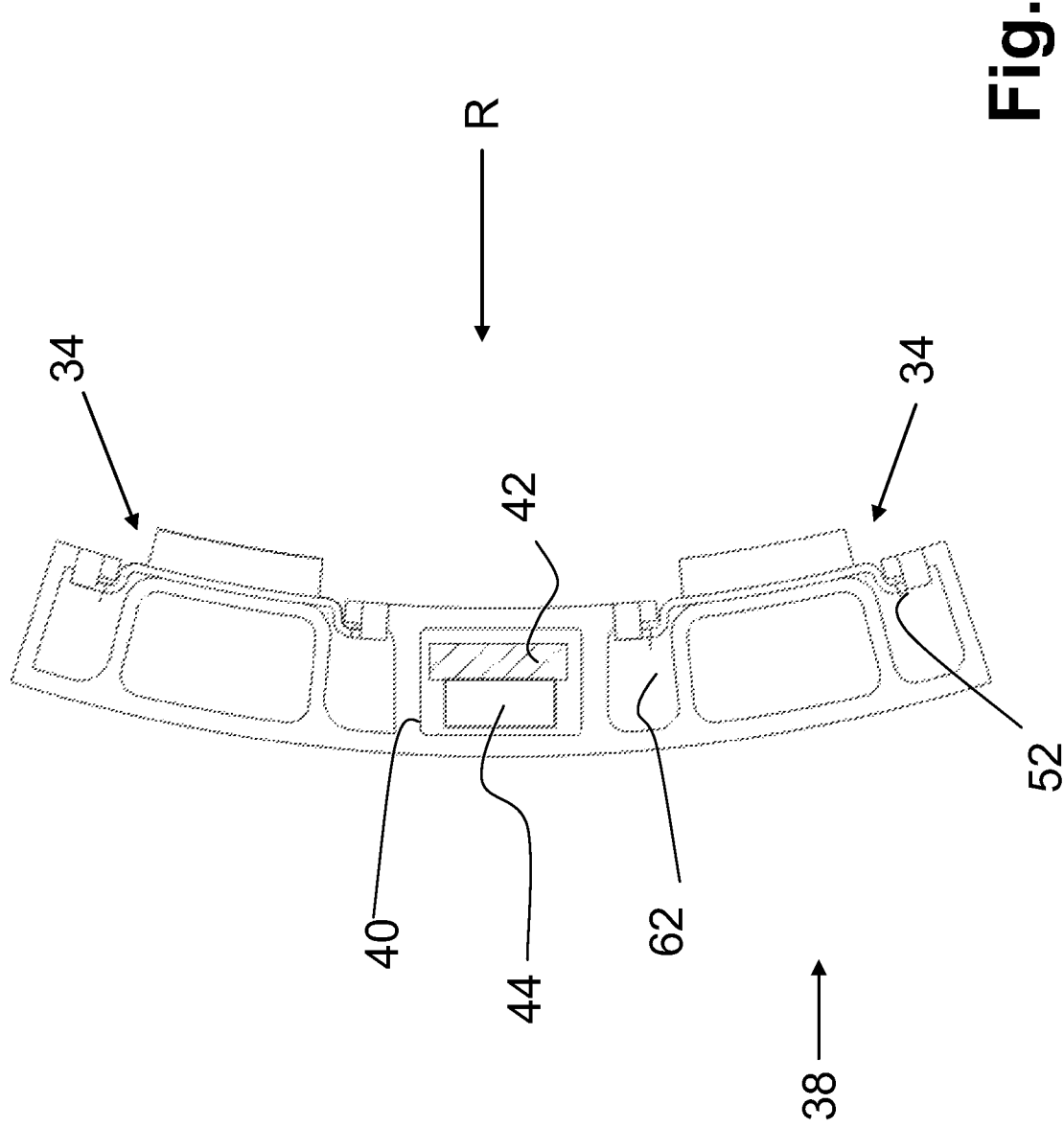
FIG. 10 is a side view of an example backing plate similar to the one shown in FIG. 9 with a torque bar shown in cross section extending in a guide slot of the backing plate.

As represented in FIGS. 3 and 4 in the example embodiment movement of the friction linings is achieved by applying and releasing pneumatic pressure in an interior area of a flexible expandable tube 36. The expandable tube 36 is positioned between the rim 18 and a plurality of backing plates 38. The backing plates are movably mounted in operative supported connection with the annular body 12 in intermediate relation of the side plates. The backing plates are in operative supported connection with the friction linings in a manner hereinafter discussed in detail. As shown in FIG. 10, the backing plates 38 include at least one guide cavity 40. A torque bar 42 extends within the guide cavity and enables the backing plate 38 to move in guided relation along the radial direction relative to the annular body. In the example arrangement release springs 44 are positioned in the guide cavity in operative engagement with the torque bars and an interior face of the guide cavity. The release springs 44 act to bias the backing plate radially outward in the direction of Arrow R as shown in FIG. 10.

In the example arrangement when elevated fluid pressure is applied to the expandable tube, the tube expands and applies an inward directed force on the backing plates 38. The backing plates which extend annularly about the central rotating member 26, move radially inward overcoming the force of the release springs. This causes the friction linings 34 that are in operative connection with the backing plates to move radially inward as well so that the wear surfaces of the friction pads thereon engage the outer surface of the central rotating member 26. By holding the fluid pressure applied to the expandable tube, the annular body 12 of the constricting clutch brake element 10, and the central rotating member 26 remain in fixed operative engagement.

Thereafter when it is desired to have the central rotating member 26 and the annular body 10 be relatively movable with respect to one another, the elevated pressure is released from the interior of the expandable tube. This causes the tube to be reduced in radial size and the release springs 44 cause the backing plates 38 to move radially outward. The friction linings disengage from the central rotating member 26 and/or at least enable relative movement of the annular body 12 and the rotating member 26, until elevated fluid pressure is again applied to the expandable tube.

As represented in FIGS. 4 and 5 in the exemplary arrangement, the expandable tube 36 has fluid pressure applied therethrough through one or more fluid conduits 46. As can be appreciated, in example arrangements the radially inward directed force applied to the friction linings can be controlled through regulating the fluid pressure that is applied to the expandable tube. For example when air pressure is used to expand the tube, an increase in the air pressure that is applied will result in a greater constricting force. This results in a greater pressure force acting between the friction linings and the central rotating member 26 and thus a more firm engagement between the annular body and the central rotating member. Further as can be appreciated, flow control valves for controlling the rate of fluid flow to and/or from the expandable tube may be included in the delivery passage that connects to the one or more fluid conduits. In this way the rate at which the expandable tube applies and releases its internal pressure, and therefore the rate of change in the force applied to the friction linings can be controlled. Of course it should be understood that these approaches are exemplary and in other embodiments other approaches may be used.

An exemplary friction lining 34 is configured to be releasibly engageable with a backing plate 38 of the example embodiment. The friction lining 34 includes a lining plate 48. The exemplary lining plate 48 is a unitary plate of suitable metallic material such as aluminum. The exemplary lining plate includes a central portion 50 and a pair of projections which comprise ear portions 52. In the exemplary arrangement the ear portions in cross section are offset from the central portion. In the exemplary arrangement the ear portions extend generally parallel to and are offset in a radially outward direction from the central portion when the friction lining 34 is in its operative position in connection with the constricting clutch brake element 10.

The example friction lining 34 further includes a friction pad 54. The friction pad 54 includes suitable generally high friction material that can withstand the compressive and shearing forces that are applied when the clutch brake element operates. In some example arrangements the friction pad 54 may be comprised of sintered metal material such as a composite of primarily sintered iron which provides a high strength friction pad. In other example arrangements friction pads may be comprised of ceramic materials, carbon fiber materials, non-asbestos organic materials or other materials that are suitable for the pressure, shear and heat conditions that are encountered in the operation of the constricting clutch brake element. In the example arrangement the friction pad has a generally rectangular geometry and includes a wear surface 56 that is configured to engage the outer annular surface of the central rotating member 26 during operation of the clutch brake element.

In the exemplary arrangement the central portion 50 of the lining plate 48 underlies friction pad 54 and is joined to the friction pad in a suitable manner. This may include, for example, the fusion of friction material that is deposited onto the central portion in some arrangements. In other arrangements the friction pad and the lining may be engaged through suitable adhesive or other types of fastener materials. Of course the particular approach that is taken will depend on the particular application for the constricting clutch brake element and the forces, temperatures and wear properties the friction linings are desired to have in the particular application in which the clutch brake element is used.

In the example embodiment the ear portions 52 include spring portions 58. The example spring portions include leaf springs that are integrally formed with the lining plate 48. The spring portions 58 are configured to biasingly engage an adjacent wall of the slot in which the ear portion extends when the friction lining is in the operative position. Such biasing engagement serves to generally prevent movement of the friction lining relative to the adjacent slot during operation of the constricting clutch brake element. It should be understood that although a leaf spring construction is shown as providing such biasing engagement in this example embodiment, in other arrangements other approaches may be used. These may include, for example, using tabs, dimples, projections, curved surfaces or other suitable structures that can provide a biasing engagement which operates to hold the friction lining in position relative to the backing plate during operation.

Further in still other arrangements the slot which is engaged by the ear portions or other structures on the friction lining, may serve to provide a biasing engagement that helps to hold the friction lining in position.

The example friction lining also includes a pair of tabs 60. In the example arrangement the tabs 60 are portions that are integrally formed with the lining plate 48. The example tabs 60 are configured to extend generally perpendicular to the central portion 50 of the lining plate as well as the wear surface. As later explained the function of the tabs 60 is to prevent further movement in an inward engaging direction of the friction lining relative to the backing plate through engagement of the tabs with the outer side of the backing plate. Such tab engagement assures that the friction lining is properly positioned relative to the backing plate in the operative position. Further in the example embodiment the tabs 60 are configured for engagement using a tool and/or manually to facilitate engagement of the friction lining and during removal therefrom from the backing plate. This can be done for example, by engaging the tabs with a prying tool and/or pliers so as to move the friction lining relative to the backing plate for purposes of disengagement therefrom. It should be understood that while in the example embodiment a pair of spaced tabs 60 are used to provide a locating stop and also to facilitate tool and manual engagement for removal, in other arrangements other structures may be employed to perform these functions.

Figure 7:
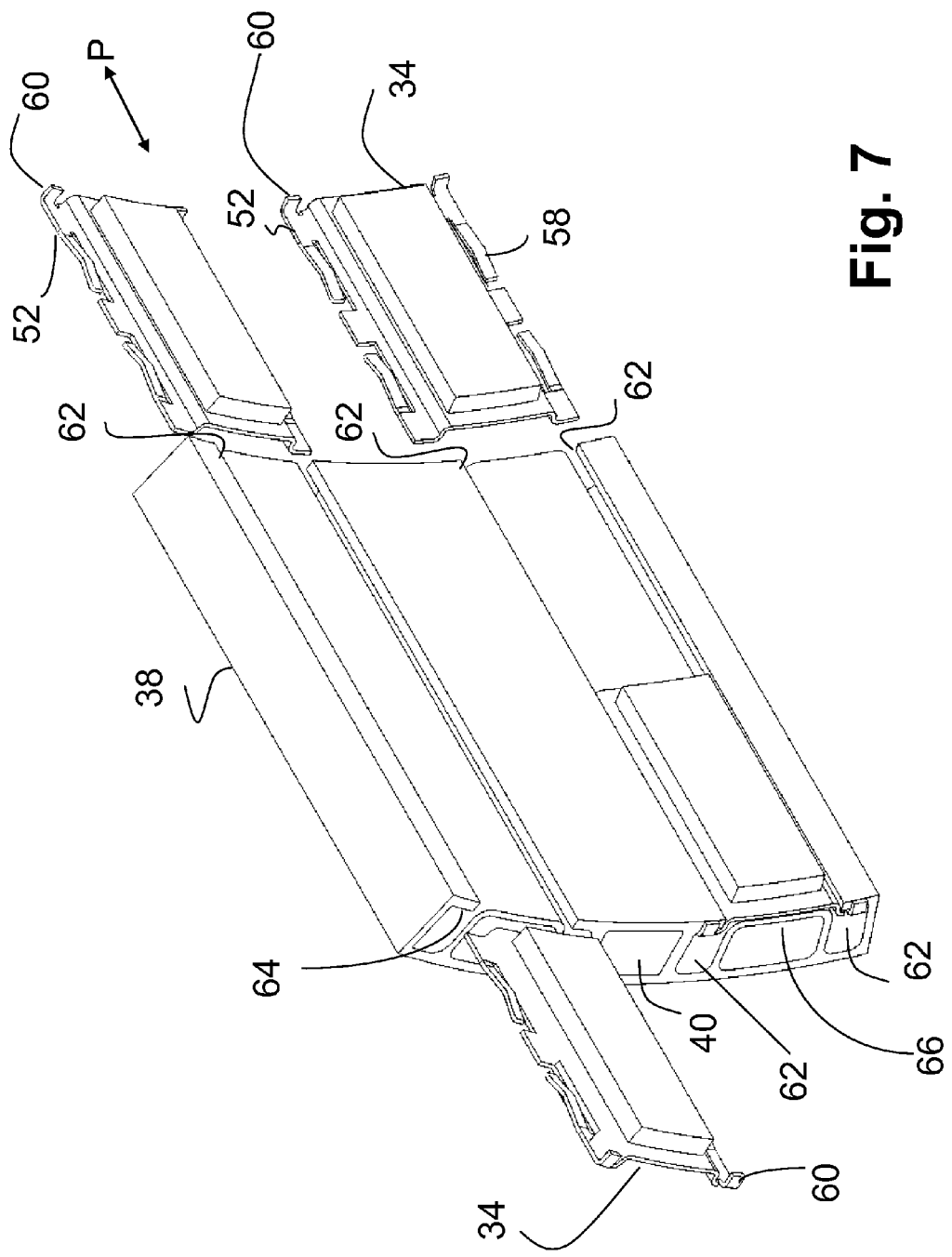
FIG. 7 is an exploded view of an example backing plate and four friction linings which can be releasibly engaged therewith.
Figure 8:
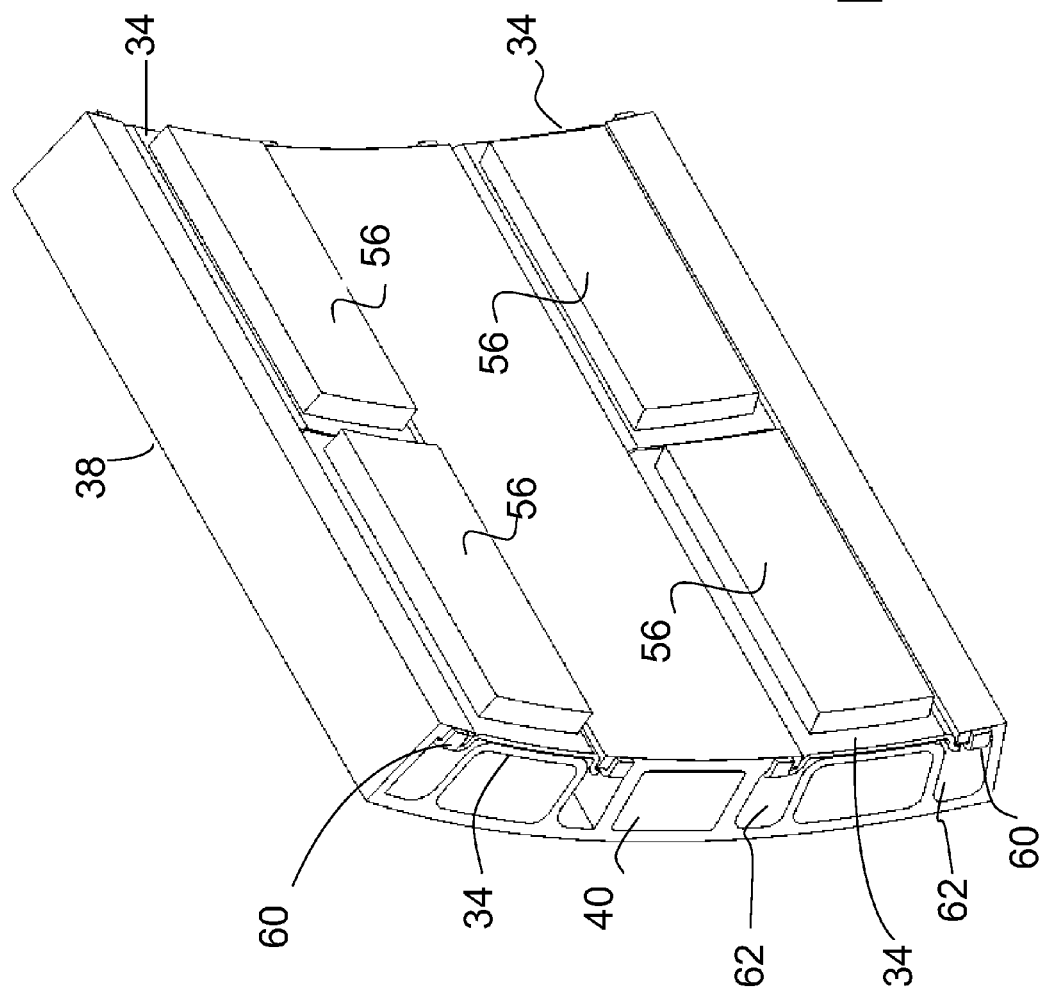
FIG. 8 is an isometric view of a backing plate similar to that shown in FIG. 7 with the friction linings shown in the operative position.
Figure 9:
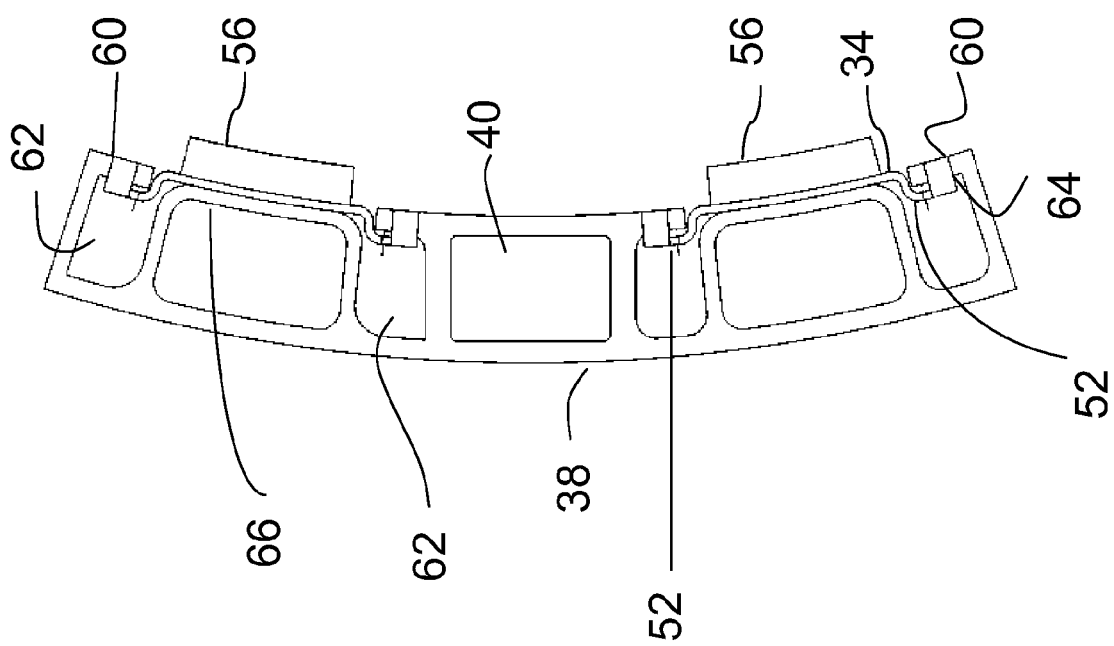
FIG. 9 is a side view of the backing plate and friction linings of FIG. 8.

As shown in FIGS. 7-9, the example friction linings 34 are operatively engaged with the backing plate 38 by engaging disposed ear portions 52 of the friction lining 34 with a pair of disposed slots 62 which extend on the backing plate 38. Each slot is bounded by an inwardly facing wall 64. In the example arrangement each slot extends across the backing plate 38 in a direction generally perpendicular to the radial direction when the backing plate is in the operative position on the annular body of the element. In the example arrangement each backing plate includes two pairs of slots, each of which pair is configured to support two friction linings in the operative position. Of course it should be understood that this approach is exemplary and in other embodiments other approaches may be used.

The exemplary backing plate includes saddle portions 66. The saddle portions 66 underlie the central portions of the friction linings in the operative position. The saddle portions 66 provide support for the friction linings and apply force thereto to strengthen the engaging force of the clutch brake element.

As shown in FIG. 7 in the example arrangement the friction linings 34 are operatively engaged with the backing plate by engaging the projecting ear portions 52 of a friction lining in the corresponding pair of slots 62 of the backing plate. The installation of a friction lining 34 is accomplished by relatively moving the ear portions and slot portions along direction P as shown in FIG. 7. To install the friction lining 34 with the corresponding ear and slot portions engaged, the lining 34 is moved inwardly along the direction of Arrow P until the tabs 60 of the lining engage the outer surface of the backing plate.

As can be appreciated once the lining 34 is in the operative connected position relative to the backing plate, the spring portions 58 provide biased engagement with the walls 64 so as to hold the lining in a fixed position relative to the backing plate. As can be seen from FIG. 7 in the example arrangement, friction linings are moved through operative engagement with the backing plate by sliding the friction linings inwardly in opposite directions in engagement with a common pair of slots. In the example arrangement the tabs 60 on the friction linings are configured so that they position the friction linings in the operative position by engagement with the backing plate regardless of which direction they may be inserted in the slots. Once all four friction linings 34 are operatively engaged with the backing plate 38 as shown in FIG. 8, the friction linings and the wear surfaces 56 thereof are enabled to move in guided connection with the torque bars generally radially inward and outward relative to the annular body as the clutch brake element is engaged and released.

The exemplary arrangement provides for angularly disposed wear surfaces of the friction linings generally circumferentially spaced about the annular body of the constricting clutch brake element. In operation the expandable tube 36 operates to move the backing plates 38 and the wear surfaces of the friction linings inward to engage the central rotating member 26 with the annular body 12 as pressure is applied to the tube, and to disengage such members when pressure is relieved from the tube. It should be understood, however, that this arrangement with four friction linings releasably mounted on a single backing plate and a plurality of such backing plates which are radially relatively movable with respect to the annular body, is exemplary and in other arrangements, other approaches may be used.

During operation of the constricting clutch brake element, the friction pads 54 eventually wear and require replacement. The example arrangement facilitates changing the friction linings relatively quickly. This can be accomplished by a mechanic engaging the tabs 60 on a respective friction lining with a prying tool such as a screwdriver, pry bar, pliers or other suitable item and moving the projecting ear portions 52 of the friction lining in an outward direction in the corresponding slots 62. Engagement of the tabs 60 enables the ear portions to be moved relative to the adjacent walls of the slots so that the friction element can be fully disengaged from the backing plate. A new friction lining may be installed by engaging the projecting ear portions thereof in the corresponding slots and moving the friction lining inward along the direction generally perpendicular of the radial direction until the tabs 60 of the lining engage the backing plate 34. This can be done for each of the friction linings that are operably engaged with each backing plate. Further in the example arrangement the friction linings are enabled to be changed without disassembly of the backing plates from the annular body. In addition in some arrangements the friction linings can also be changed while the central rotating member 26 remains in position. This capability to change the friction linings without significant disassembly of the constricting clutch brake element can in many instances reduce machine downtime and enable the machinery in which the element is used, to be more productively used.

It should be appreciated that while in the exemplary arrangement the friction linings and backing plates use an interengaging projection and slot construction where the projections include the ear portions on the friction lining and the slots are positioned in the backing plate, alternative arrangements employing these principles may be used. For example, in other configurations the backing plates may include one or more suitably formed projections that engage one or more slots that are operatively connected to a lining that supports a friction pad. Such arrangements may also enable a change of friction linings in a generally rapid manner to facilitate replacement thereof.

Further it should be understood that while in the exemplary arrangement generally rectangular spaced friction pads and linings are used, in other arrangements linings and friction materials may have other suitable shapes for purposes of providing the desired engagement between the relatively movable components of the clutch brake element. In addition in other arrangements, different configuration friction linings may be used so that the linings can be changed through accessing only one side of a constricting clutch brake element. For example in such arrangements such friction linings may be elongated so that a single lining and friction pad cover the entire distance across the engagement area of the central rotating member. Further in still other arrangements friction linings may include suitable barbs, hooks, tabs, contoured surfaces or other arrangements so that multiple friction linings may be joined and moved together inwardly to and/or outwardly from the operative position. Such arrangements may in some configurations facilitate the removal of multiple friction linings when access is available from only one side of the element. Of course it should be understood that these approaches are exemplary of numerous different approaches that may be utilized when employing the principles described herein.

In the foregoing description certain terms have been used to describe example arrangements and for purposes of brevity, clarity and understanding. However, no unnecessary limitations are to be implied therefrom because such terms have been used for descriptive purposes and are intended to be broadly construed. Moreover the descriptions and illustrations herein are by way of examples and the inventive teachings are not limited to the specific features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description, or mere equivalents thereof.

Having described the features, discoveries and principles of the exemplary embodiments, the manner in which they are constructed and operated and the advantages and useful results attained; the new and useful structures, devices, elements, arrangements, parts, combinations, systems, equipment, operations, methods, processes and relationships are set forth in the appended claims.

I claim:

1. Apparatus comprising:
 a friction lining configured for removable engagement with a constricting clutch brake element,
 wherein the clutch brake element includes
  a generally annular body,
  a backing plate movably mounted in operative connection with the body, wherein the backing plate is movable in a radial direction relative to the body,
 wherein the friction lining includes,
  a lining plate,
  a friction pad in operative supported engagement with the lining plate,
  wherein the friction pad includes a wear surface, wherein the wear surface is generally opposed of an area of engagement of the friction pad and the lining plate,
  a pair of ear portions, wherein each ear portion is in operative supported connection with the lining plate and extends generally parallel of the wear surface, wherein at least one ear portion includes at least one spring portion,
  wherein each ear portion is configured to releasably slidingly engage a corresponding slot of the backing plate, wherein each slot extends generally perpendicular of the radial direction, wherein the slot configured to slidingly engage the at least one ear portion that includes the at least one spring portion, is bounded by a wall, wherein the at least one spring portion is configured such that in the operative positions of the friction lining and the backing plate, the at least one spring portion biasingly engages the wall, whereby in operative engaged relation of the friction lining and the backing plate, the wear surface is movable relative to the annular body in the radial direction.

2. The apparatus according to claim 1
wherein the at least one spring portion includes at least one leaf spring, wherein the leaf spring is integral with the respective ear portion.

3. The apparatus according to claim 1
wherein the ear portions are integral of the lining plate.

4. The apparatus according to claim 3
wherein the lining plate includes in cross section
a central portion, wherein the central portion underlies the friction pad at a side of the friction pad opposed of the wear surface, and
wherein each of the ear portions extends generally parallel to and are offset from the central portion.

5. The apparatus according to claim 4 and further comprising:
at least one tab portion, wherein the at least one tab portion is in operative connection with the lining plate,
wherein the at least one tab portion is configured to engage the backing plate such that when the friction lining and the backing plate are in operatively engaged relation, the at least one tab portion is operative to prevent relative movement of the friction lining and the backing plate in at least one direction perpendicular to the radial direction.

6. The apparatus according to claim 5
wherein the at least one tab portion is integral of the lining plate, and wherein in cross section at least one tab portion extends generally perpendicular of the central portion.

7. The apparatus according to claim 5
wherein the at least one tab portion is configured for tool engagement external of the element, such that the ear portions can be moved relative to the respective slots through tool engagement with the at least one tab portion.

8. The apparatus according to claim 5 and further comprising:
the backing plate,
wherein the backing plate includes a pair of opposed slots, wherein each slot of the pair is configured to releasably engage simultaneously respective ear portions of first and second friction linings,
wherein the first friction lining is extendable into operatively engaged relation with the backing plate by movement relative to the backing plate in a first direction perpendicular of the radial direction, and
wherein the second friction lining is extendable into operatively engaged relation with the backing plate by movement relative to the backing plate in a second direction perpendicular of the radial direction, wherein the second direction is generally opposite of the first direction.

9. The apparatus according to claim 8
wherein the backing plate includes in cross section a saddle portion, wherein the saddle portion is disposed intermediate of the slots included in the pair, wherein when the first and second friction linings are in operative engaged relation with the backing plate, the saddle portion underlies the respective central portions of each of the first and second friction linings.

10. The apparatus according to claim 8
wherein the backing plate includes at least one guide cavity, wherein the at least one guide cavity is configured to accept therein in relatively movable relation at least one torque bar, wherein the at least one torque bar is in operative supported connection with the annular body and enables movement of the backing plate in the radial direction relative to the annular body,
and wherein the at least one guide cavity is further configured to accept therein at least one release spring, wherein the at least one release spring is configured to bias the backing plate radially outward relative to the annular body.

11. The apparatus according to claim 10 and further comprising:
the annular body, wherein the annular body includes a pair of disposed annular side plates and an annular rim intermediate of the annular side plates,
wherein the at least one torque bar is in operative supported connection with each of the pair of annular side plates, and wherein the backing plate is radially movable between the annular side plates,
an expandable tube, wherein the expandable tube is positioned radially intermediate of the rim and the backing plate, wherein the expandable tube is radially expandable and retractable responsive to application and removal of fluid pressure therefrom,
wherein the application of and release of fluid pressure from the expandable tube is operative to cause the respective wear surfaces of the first and second friction linings to move radially inward and outward respectively, relative to the annular body.

12. The apparatus according to claim 1 and further comprising
at least one tab portion, wherein the at least one tab portion is in operative connection with the lining plate,
wherein the at least one tab portion is configured to engage the backing plate, such that when the friction lining and the backing plate are in operatively engaged relation, the at least one tab portion is operative to prevent relative movement of the friction lining and the backing plate in at least one direction perpendicular to the radial direction.

13. The apparatus according to claim 1
wherein the ear portions extend on opposed sides of the wear surface.

14. Apparatus comprising:
a friction lining configured for removable engagement with a constricting clutch brake element, wherein the element includes
a generally annular body,
a backing plate movably mounted in operative supported connection with the body, wherein the backing plate is selectively movable radially relative to the body,
wherein the friction lining includes:
a lining plate,
a friction pad operatively engaged with the lining plate, and
at least one projecting portion in operative connection with the lining plate,
at least one spring portion,
wherein the at least one spring portion is in operative connection with the at least one projecting portion, wherein the at least one projecting portion is configured to releasably slidingly engage at least one corresponding slot of the backing plate to operatively engage and disengage the friction lining and the element,
  wherein the at least one slot is bounded by at least one wall,
  wherein the at least one spring portion is configured to biasingly engage the at least one wall in operative positions of the friction lining and the backing plate.
15. The apparatus according to claim 14 and further comprising:
  at least one tab in operative connection with the lining plate, wherein the at least one tab is configured to limit through rigid engagement of the at least one tab and the backing plate, relative sliding movement of the at least one projecting portion and the at least one slot in at least one direction, to operative positions of the friction lining and the backing plate.
16. The apparatus according to claim 14
wherein the lining plate includes a pair of projecting portions,
wherein the projecting portions extend on opposed sides of the friction pad.
17. The apparatus according to claim 16
wherein each of the projecting portions extend generally perpendicular of the radial direction.
18. Apparatus comprising:
a constricting clutch brake element including:
  a generally annular body,
  a backing plate movably mounted in operative connection with the body, wherein the backing plate is movable along a radial direction relative to the annular body,
  an expandable tube in operative connection with the backing plate, wherein the expandable tube is operative to move the backing plate radially inward responsive to tube expansion,
  a friction lining, wherein the friction lining is in operative connection with a friction pad, wherein the friction pad is radially movable relative to the body responsive to radial movement of the backing plate,
  an interengaging projection and slot, wherein the friction lining includes one of the projection and slot and the backing plate includes the other of the projection and slot,
    wherein one of the projection and a wall bounding the slot includes at least one spring portion,
    wherein the backing plate and the friction lining are releasably engageable through relative movement thereof in a direction generally perpendicular of the radial direction, and
    wherein the at least one spring portion is configured so that in an operative position of the friction lining the one of the projection and the wall including the at least one spring portion biasingly engages the other of the projection and the wall.
19. The apparatus according to claim 18
wherein the lining plate includes in cross section
a central portion, wherein the central portion underlies the friction pad at a side of the friction pad opposed of the wear surface, and
  wherein each of the ear portions extend generally parallel to and are radially and angularly offset from the central portion.
20. The apparatus according to claim 18
wherein the friction lining includes a pair of projections, wherein each of the projections is disposed away from the pad on opposed angular sides thereof.
21. Apparatus comprising:
a constricting clutch brake element including:
  a generally annular body,
  a rigid backing plate movably mounted in operative connection with the body, wherein the backing plate is movable along a radial direction relative to the annular body,
  an expandable tube in operative connection with the backing plate, wherein the expandable tube is operative to move the backing plate radially inward responsive to tube expansion,
  first and second friction linings, wherein each friction lining includes
    a lining plate,
    a friction pad in operative connection with the lining plate, wherein the friction pad includes a wear surface, wherein the wear surface is generally opposed of a central portion of the lining plate that is radially disposed outwardly of the friction pad,
    a pair of ear portions, wherein each ear portion is in operative connection with the lining plate and extends generally parallel of the wear surface,
  wherein the backing plate includes a pair of opposed slots, wherein each slot of the pair is configured to concurrently releasably engage respective ear portions of the first and second friction linings,
  wherein the first friction lining is extendable into operative engaged relation with the backing plate by movement relative to the backing plate in a first direction perpendicular of the radial direction, and
  wherein the second friction lining is extendable into operative engaged relation with the backing plate by movement relative to the backing plate in a second direction perpendicular of the radial direction, wherein the second direction is generally opposite of the first direction.
22. The apparatus according to claim 21
wherein the backing plate further includes
  a further pair of opposed slots,
    wherein each slot of the further pair is configured to releasably accept ear portions of friction linings,
    wherein each slot of the further pair is configured to releasably engage simultaneously ear portions of third and fourth friction linings, wherein in the operative position of the backing plate the wear surfaces of the third and fourth friction linings are angularly disposed relative to the annular body from the wear surfaces of the first and second friction linings.
23. The apparatus according to claim 22
wherein the backing plate includes a guide cavity, wherein the guide cavity is disposed angularly intermediate relative to the annular body, of the pair and further pair of slots,
wherein the guide cavity is configured to accept therein in relatively movable relation a torque bar, wherein the torque bar is in operative supported connection with the annular body and enables movement of the backing plate in the radial direction relative to the annular body, and
wherein the guide cavity is further configured to accept therein at least one release spring, wherein the at least one release spring is configured to bias the backing plate radially outward relative to the annular body.
24. Apparatus comprising:
a friction lining configured for removable engagement with a constricting clutch brake element,
wherein the clutch brake element includes a generally annular body, a rigid backing plate movably mounted in operative connection with the body, wherein the backing plate is movable in a radial direction relative to the body, wherein the backing plate includes a radially extending side surface, wherein the friction lining includes, a lining plate, a friction pad in operative connection with the lining plate, wherein the friction pad includes a wear surface, wherein the wear surface is generally opposed of a central portion of the lining plate that is radially disposed outwardly of the friction pad, a pair of ear portions, wherein each ear portion is in operative connection with the lining plate and wherein in an operative position of the friction lining, each ear portion extends generally parallel of and away from the wear surface in a direction perpendicular to the radial direction, wherein at least one of the pair of ear portions is in operative connection with a rigid tab, wherein the tab extends transverse to the wear surface, wherein each ear portion is configured to releasably slidingly engage a corresponding slot of the backing plate, wherein each slot extends generally perpendicular of the radial direction and away from the wear surface, and wherein the tab is configured to engage the side surface in the operative position of the friction lining.

25. The apparatus according to claim 24 wherein at least one of the ear portions is contoured to include a deformable spring portion, wherein the spring portion is configured to biasingly engage at least one surface bounding a respective corresponding slot.

26. The apparatus according to claim 24 wherein each ear portion extends generally parallel to and in the operative position is radially outwardly offset from the central portion of the lining plate.

* * * * *